United States Patent
Fang et al.

(10) Patent No.: US 10,947,118 B2
(45) Date of Patent: Mar. 16, 2021

(54) CARBON NANOTUBES AND PREPARATION METHOD THEREOF BY USING PET

(71) Applicant: Xi'an University of Technology, Xi'an (CN)

(72) Inventors: Changqing Fang, Xi'an (CN); Xing Zhou, Xi'an (CN); Rong Yang, Xi'an (CN); Shaofei Pan, Xi'an (CN); Wanqing Lei, Xi'an (CN); Yan Li, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 335 days.

(21) Appl. No.: 15/957,011

(22) Filed: Apr. 19, 2018

(65) Prior Publication Data
US 2018/0319665 A1 Nov. 8, 2018

(30) Foreign Application Priority Data
May 8, 2017 (CN) .......................... 201710315340.7

(51) Int. Cl.
*C01B 32/16* (2017.01)

(52) U.S. Cl.
CPC .......... *C01B 32/16* (2017.08); *C01B 2202/06* (2013.01); *C01B 2202/36* (2013.01); *C01P 2002/82* (2013.01); *C01P 2004/03* (2013.01); *C01P 2004/04* (2013.01); *C01P 2004/133* (2013.01); *Y02P 20/584* (2015.11)

(58) Field of Classification Search
CPC ..... C01B 32/158; C01B 32/16; C01B 32/174; C01B 2202/06; C01B 2002/82; C01P 2004/133; C01P 2004/03; C01P 2004/04; C01P 2004/13; C01P 2002/82
See application file for complete search history.

(56) References Cited

U.S. PATENT DOCUMENTS

2019/0001532 A1* 1/2019 Guha .................... B09B 3/0016

OTHER PUBLICATIONS

Shamsi, Ramin, and Gity Mir Mohamad Sadeghi. "Novel polyester diol obtained from PET waste and its application in the synthesis of polyurethane and carbon nanotube-based composites: swelling behavior and characteristic properties." RSC advances 6.44 (2016): 38399-38415.*

* cited by examiner

*Primary Examiner* — Richard M Rump
(74) *Attorney, Agent, or Firm* — Lathrop GPM LLP

(57) ABSTRACT

The present invention relates to carbon nanotubes and a preparation method thereof by using PET. The carbon nanotubes of the present invention are prepared by processes of alcoholysis of PET materials, processes of washing, crushing and calcining unreacted intermediates and so on. By the preparation method of the present invention, multi-walled carbon nanotubes prepared by using waste PET have a good conductivity, and are a structure of top-down array with low aspect ratio. The method of the present invention is not only easy to implement, but also does not need a catalyst, and turns the waste PET into treasure, which solves the problem of environmental pollution caused by the increasingly serious waste PET. FIG. 9.

15 Claims, 17 Drawing Sheets

CARBON NANOTUBES AND PREPARATION METHOD THEREOF BY USING PET

RELATED APPLICATIONS

This application claims priority to CN 201710315340.7, filed May 8, 2017, the contents of which are incorporated herein by reference.

FIELD OF THE INVENTION

The invention relates to fields of the preparation of carbon nanomaterials and the recycling of packaging waste, in particular to an array type multi-walled carbon nanotubes and preparation method thereof, and a method for preparing carbon nanotubes by using waste PET.

BACKGROUND OF THE INVENTION

In 1993, Science magazine reported the preparation method of single-walled carbon nanotubes (SWCNTs) for the first time, which led to the upsurge of carbon nanotubes (CNTs) research and promoted the rapid development of Nano Science. CNTs are a hollow cylindrical structure made of twisted graphene sheets. The special structure of CNTs makes it have higher mechanical strength, better electrical conductivity, thermal conductivity, thermal shock resistance, corrosion resistance and better self lubrication performance than graphite. Among them, multi-walled carbon nanotubes (MWCNTs) are composed of concentric carbon nanotubes, which are widely studied because of their low cost, especially in the field of electrical conductivity. Because CNTs have excellent electrical conductivity, taking the single-walled carbon nanotubes (SWCNTs) as an example, the resistivity (r) of the singlewalled carbon nanotubes (SWCNTs) is $1.3 \times 10^{-6}$ Ω·cm (i.e., the conductivity is $7.7 \times 10^5$ S/cm), which is higher than the resistivity of the widely used metal copper. At the same time, SWCNTs have the advantages of light weight, high current-carrying capacity, high strength, flexibility and excellent mechanical properties. It is the most ideal conductive material in the future. It is more noteworthy that, the carbon nanotubes are "natural" ultra thin channel, and the property and the fact make the carbon nanotubes realize the ballistic transport of electrons in high performance electronic devices, in other words, the carbon nanotubes realize free scattering transport of electrons. In fact, as the only existing material for ballistic transport at room temperature, CNTs provide the possibility to build pervasive ultra-low power devices and high performance intermediate transport media. Both SWCNTs and MWCNTs with small diameter can show the characteristics of quantum transmission.

At present, the methods for preparing CNTs mainly are arc discharge, laser evaporation and chemical vapor deposition. At first, people mainly used high temperature method to prepare CNTs, such as arc discharge or laser evaporation. Nowadays, these methods have been replaced by chemical vapor deposition with low temperature (less than 800° C.), making it easier to achieve large-scale production and more suitable for applications on composites with large amounts of CNTs. However, the defects of this method are quite obvious. Not only a large amount of gas is needed as carbon source, but also the catalytic efficiency of this method is low, only a small amount of carbon source can be catalyzed to form CNTs.

Polyethylene terephthalate (PET) has excellent mechanical properties, anti friction and wear resistance at room temperature. In addition, PET has good creep resistance, excellent rigidity, hardness and so on. It is non-toxic and tasteless, and it has good transparency, high surface gloss and glassy appearance. So the PET has been widely used in many fields such as food packaging, thin film, fiber, film base and electrical insulation materials. The output of PET every year accounts for 18% of the world's total polymer output, just less than polyethylene (PE) and polypropylene (PP), and ranks third in the world. Especially in the liquid beverage industry, PET bottles have taken the place of glass bottles and metal bottles, becoming the main body of liquid packaging products. According to the data of China Information Network Holdings Limited, PET bottles have accounted for more than 70% in the market share of world's large beverage power. In our country, since China's soft drinks output reached 1.18 billion tons in 2011, the soft drinks output has maintained a 15%-20% growth rate. It is expected that the output will be more than 2.5 billion tons by 2017. The fierce competition in the beverage industry will also make the development of bottle blowing and filling technology more urgent, which provides a broad market development space for the wider application of PET bottles in soft packaging.

However, the plastic recycling problem comes with the unceasing increase of PET bottle production, and the number of discarded PET bottles per year increases in proportion to its production accordingly, which brings environmental pollution far greater than its benefits. Therefore, the recycling and reprocessing of PET bottles in the packaging industry are becoming more and more serious. Nowadays the reuse and recycling of polymer waste has got rid of the concept of simple thrift, and it has been linked with environmental protection, resource recycling and even the sustainable development strategy of national economy. It has also become an important new force to promote the healthy and sustainable development of the plastics industry at the same time, and the huge economic benefits contained have aroused a lot of attention. In 2016, the degradation of waste PET once again became a social hot spot, especially in China, the problems that the activities of garbage boats in the Yangtze River Basin seriously affect environment have been discovered. The problems such as how the recycling of waste PET should go, and the application directions of its downstream products are urgently to be solved.

Patent CN200410011337 uses polyolefin combustion method to prepare carbon nanotubes, which solves the problem of waste plastic recycling. However, the method requires the use of nickel-supported catalyst and modified montmorillonite, and the purification is needed to obtain the final carbon nanotubes, which requires the use of corrosive, irritating hydrofluoric acid. So the method of producing carbon nanotubes still needs to be improved.

SUMMARY OF THE INVENTION

Technical problem existing in the prior art is that, the traditional arc discharge method, the laser evaporation method producing carbon nanotubes need to consume a lot of energy and produce low yields of carbon nanotubes. Catalysts are needed in chemical vapor deposition method, and the products contain a lot of impurities and the carbon nanotubes produced are easy to wrap. Waste PET bottles are one of the packaging waste polymer, and a major pollution of environmental pollution. However, its recycling methods are less at present, and the added-value of the products is low.

To solve the above-mentioned technical problems, the inventors have found that after the waste packaging PET is recycled and processed, it is subjected to carry out alcoholysis to prepare an alcoholic product with an active hydroxyl group and intermediates of incomplete alcoholysis, then the intermediates are used for the preparation of CNTs, to obtain MWCNTs with good electrical conductivity and array structure.

Specifically, the present invention provides the following technical solutions:

The present invention provides a method for preparing carbon nanotubes, comprises the steps of:

Step (1): carrying out alcoholysis of PET packaging materials with alcohol, to obtain alcoholysis products and intermediates of PET packaging materials wherein the alcoholysis is not completely carried out, Step (2): separating the intermediates from step (1), Step (3): crushing the intermediates obtained from step (2) to obtain powder of the intermediates, and Step (4): calcining the powder of step (3).

Preferably, with regard to said method, wherein the alcoholysis of step (1) comprises steps of: mixing PET packaging materials with alcohol to form an alcoholysis reaction system, and adding catalyst to the alcoholysis reaction system.

Preferably, with regard to said method, wherein said catalyst is added to the alcoholysis reaction system of step (1) in 2 divided parts: adding part of the catalyst, preferably half of the catalyst to the reaction system for the first time, after completing reaction, the remaining part of the catalyst being added to the reaction system for the second time, and the reaction being continued.

Preferably, with regard to said method, wherein in step (1), adding 10-40 parts by weight of the PET packaging materials, 8-45 parts by weight of alcohol, and 0.3-5 parts by weight of the catalyst for alcoholysis.

Preferably, with regard to said method, wherein in step (1), the PET packaging materials by weight by weight and alcohol by weight are put in a container and mixed at 150° C.-170° C., after 30-60 minutes, the temperature is adjusted to 200° C.-220° C., and a part of the catalyst, preferably half of the catalyst is added to the reaction system, after completing reaction, the remaining catalyst is added to the reaction system and the reaction system is continued; finally the reaction system is reacted at 20-35° C., preferably at room temperature.

Preferably, with regard to said method, wherein step (2) comprises the steps of: the intermediates separated being washed with anhydrous ethanol and deionized water alternately for several times, and then the intermediates being vacuum dried.

Preferably, with regard to said method, wherein on the occasion of being vacuum-dried, a vacuum degree is 0.02-0.08 MPa, and temperature is 40-60° C.

Preferably, with regard to said method, wherein step (3) comprises the steps of: the obtained powder being screened to obtain the powder of the intermediates through sieve, and the screen size being 180 mesh to 230 mesh, preferably 200 mesh of Taylor standard sieve.

Preferably, with regard to said method, wherein calcination temperature of step (4) is 600-800° C.

Preferably, with regard to said method, comprises of washing the powder of the intermediates of step (3) with deionized water for several times.

Preferably, with regard to said method, wherein, it is not necessary to use a catalyst in step (4).

Preferably, with regard to said method, the PET packaging materials are waste PET packaging materials.

Preferably, with regard to said method, wherein said catalyst is one or two or more selected from the group consisting of tetrabutyl titanate, isopropyl titanate, tetramethyl titanate, titanium tetrapropanolate, tetraethyl titanate, tetra amyl titanate, bis(triethanolamine)diisopropyltitanate, 2-hydroxypropanoic acid—titanium ammoniate hydrate, zinc acetate, dibutyltin oxide, manganese acetate, lead acetate, and cobalt acetate.

Preferably, with regard to said method, wherein, said alcohol is one or two or more selected from the group consisting of monohydric alcohol or diol or their oligomers.

Preferably, with regard to said method, wherein, said monohydric alcohol is one or two or more selected from the group consisting of methanol, ethanol, propanol, butanol, pentanol, hexanol, heptanol, octanol, nonanol, decyl alcohol and hendecanol.

Preferably, with regard to said method, wherein, said diol is one or two or more selected from the group consisting of neopentyl glycol, dipropylene glycol, ethylene glycol, 1,4-cyclohexanedimethanol, cyclobutanediol, 1, 2-propylene glycol, 1,3-propylene glycol, 2-methyl-propanediol, 1,4-butanediol, 1,5-pentadiol, 1,6-hexanediol, diethylene glycol, triethylene glycol, propylene glycol, tripropylene glycol, poly (tetrahydrofuran), polyethylene glycol and polypropylene glycol.

Preferably, with regard to said method, wherein, a polymerization degree of said polyethylene glycol or polypropylene glycol is 4-100.

Preferably, with regard to said method, wherein, in step (1), adding 10-40 parts by weight of the PET packaging materials, 5-25 parts by weight of neopentyl glycol, 3-20 parts by weight of dipropylene glycol, and 0.3-5 parts by weight of tetrabutyl titanate for alcoholysis.

Preferably, with regard to said method, wherein, the waste PET packaging materials are purified in step (A) before the alcoholys of step (1).

Preferably, with regard to said method, wherein, said purification step (A) comprises the following steps:

step one, the waste PET packaging materials are cut into sheets to obtain waste PET sheets;

step two, the waste PET sheets obtained from step one are cleaned in water and filtered, preferably the cleaning is cleaning ultrasonically, preferably the water is selected from distilled water or deionized water;

step three, the waste PET sheets obtained from step two are repeatedly cleaned for several times; and step four, the waste PET sheets obtained from step three are dried naturally, and then are vacuum-dried.

The present invention also provides carbon nanotubes obtained by any one of the above methods.

Preferably, with regard to said carbon nanotubes, wherein, the carbon nanotubes are multi-walled carbon nanotubes.

Preferably, with regard to said carbon nanotubes, wherein, the inner diameter of said multi-walled carbon nanotubes is 5 nm-10 nm.

Preferably, with regard to said carbon nanotubes, wherein, the outer diameter of said multi-walled carbon nanotubes is 20 nm-80 nm.

Preferably, with regard to said carbon nanotubes, wherein the multi-walled carbon nanotubes are top-down arrays.

Preferably, with regard to said carbon nanotubes, wherein, aspect ratio of said multi-walled carbon nanotubes is 1-25.

Preferably, with regard to said carbon nanotubes, wherein said multi-walled carbon nanotubes are integrated block array multi-walled carbon nanotubes.

The present invention also provides applications of the carbon nanotubes in conductive material, super capacitor, catalyst carrier, hydrogen storage material, field emission material, or hydrophobic material.

The beneficial effects of this invention include:

The present invention provides a novel method for preparing carbon nanotubes, which only needs to carry out alcoholysis, crush and calcine of the PET packaging materials. The process is simple and easy to be industrialized on a large scale. The calcination process requires no catalyst and has high efficiency. The process needs low reaction temperature and the production cost is low. No toxic and hazardous substances are produced in the production process. The preparation method is green and the yield is up to 40%. No purification operation is required.

The present invention provides new solutions for recycling waste PET. And the waste PET turns the harm into a benefit. The solutions not only solve environmental problems, but also promote the development of packaging industry. At the same time, the obtained carbon nanotubes are high added-value products, and realize high output value development of PET recycling.

The multi-walled carbon nanotubes of the present invention have good electrical conductivity and are in the form of an array, low aspect ratio, and an integrated block structure. The multi-walled carbon nanotubes can be used as conductive material, supercapacitor, catalyst carrier, hydrogen storage material, and field emission materials etc.

The carbon nanotubes of the present invention are hydrophobic and can be used as hydrophobic material, which can be applied in the field of self-cleaning coatings.

The present invention and its advantageous technical effects will be described in detail below with reference to the accompanying drawings and various specific embodiments, wherein:

DESCRIPTION OF THE PREFERRED EMBODIMENT

Figure 1:
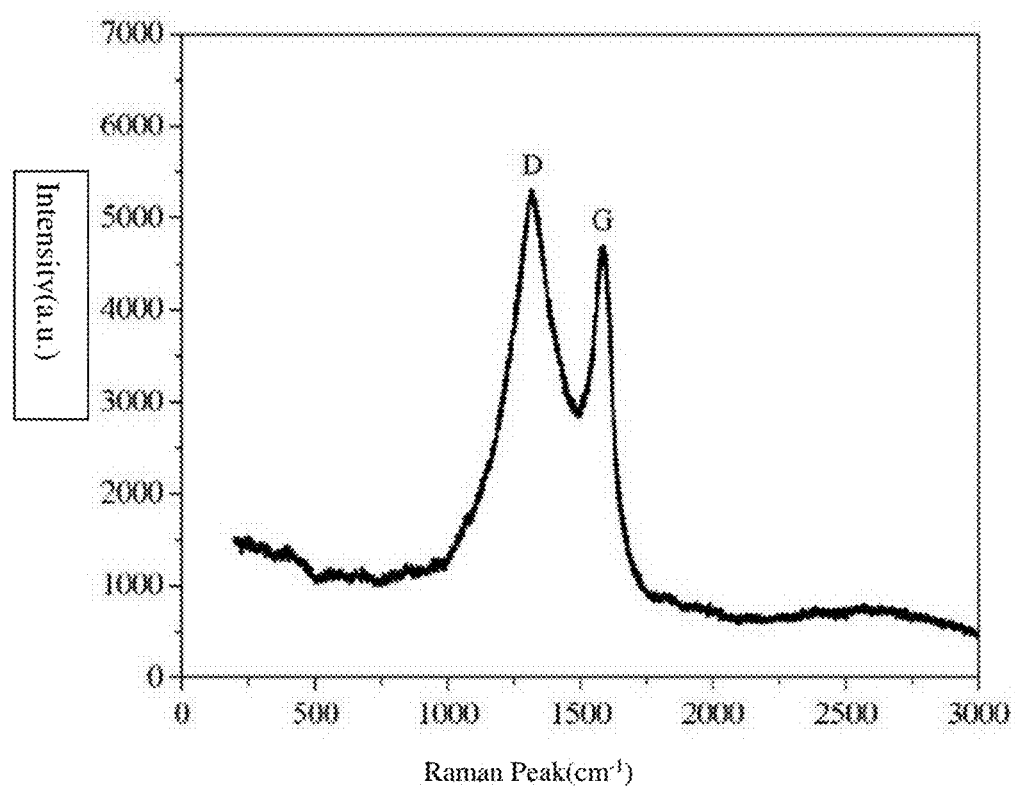
FIG. 1 is a Raman spectrogram of the carbon nanotubes prepared by Example 1 of the present invention.

In the specification and in the claims, the terms "including" and "comprising" are open-ended terms and should be interpreted to mean "including, but not limited to . . . ." These terms encompass the more restrictive terms "consisting essentially of" and "consisting of".

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

In chemistry, an alcohol is any organic compound in which the hydroxyl functional group (—OH) is bound to a saturated carbon atom, such as methanol, ethanol, propanol, butanol, pentanol, hexanol, heptanol, octanol, nonanol, decyl alcohol and hendecanol, neopentyl glycol, dipropylene glycol, ethylene glycol, 1,4-cyclohexanedimethanol, cyclobutanediol, 1, 2-propylene glycol, 1,3-propylene glycol, 2-methyl-propanediol, 1,4-butanediol, 1,5-pentadiol, 1,6-hexanediol, diethylene glycol, triethylene glycol, propylene glycol, tripropylene glycol, poly (tetrahydrofuran), polyethylene glycol and polypropylene glycol and the like.

Polyethylene terephthalate, commonly abbreviated to PET, PETE, or the obsolete PETP or PET-P, is the most common thermoplastic polymer resin of the polyester family and is used in fibers for clothing, containers for liquids and foods, thermoforming for manufacturing, and in combination with glass fiber for engineering resins.

Catalysis causes the increase in the rate of a chemical reaction due to the participation of an additional substance called a catalyst, which is not consumed in the catalyzed reaction and can continue to act repeatedly. Common catalysts for polyester synthesis include titanium-based catalysts such as tetrabutyl titanate, isopropyl titanate, tetramethyl titanate, N-propyl titanate, tetraethyl titanate, tetrapentyl titanate, bis(triethanolamine)diisopropyl titanate, and dihydroxybis(ammonium lactato)titanium(IV) and the like, and acetate catalysts such as zinc acetate, manganese acetate, lead acetate, and cobalt acetate and the like; and organotin-based catalysts such as dibutyltin oxide and the like.

As mentioned above, the purpose of the present invention is to provide top-down array with low aspect ratio multi-walled carbon nanotubes (MWCNTs) and its simple and easy preparation method. Moreover, the raw materials for the preparation of MWCNTs are derived from discarded PET, which turns the waste PET into treasure. It solves the problem of environmental pollution caused by the increasingly serious waste PET, reuses discarded PET bottles and multi-walled carbon nanotubes (MWCNTs) array with good conducting performance are prepared.

Generally, the aspect ratio of carbon nanotubes is more than 1000, while the aspect ratio of the carbon nanotubes of the present invention is less than 100, many of which is 1-50, and most of which is 1-25.

In a preferred embodiment of the present invention, the present invention provides a method for the preparation of multi-walled carbon nanotubes comprising the following steps:

Step a: 10 to 40 parts by weight of the PET packaging materials, 8-45 parts by weight of alcohol, 0.3-5 parts by weight of the catalysts, mixing the PET packaging materials with alcohol to form alcoholysis reaction system at 150° C.-170° C. After 30-60 minutes, the temperature being adjusted to 200° C.-220° C., and a part of the catalyst, preferably half of the catalyst being dropwise added to the system. After completing reaction, the remaining catalyst being added to the reaction system for the second time, and the reaction being continued. Finally the reaction system continuing to react at 20-35° C., preferably at room temperature, to obtain the alcoholysis products and intermediates of the PET packaging materials wherein the alcoholysis is not completely carried out.

The PET packaging materials used herein can be PET bottles, PET cans, PET barrels, PET cases, PET tubes, PET boxes and any other PET materials which are used as packaging materials.

Step b: the intermediates being separated from step a, and washed with anhydrous ethanol and deionized water alternately for several times. The intermediates being then vacuum dried at vacuum degree of 0.02-0.08 MPa and temperature of 40-60° C. to obtain the brittle intermediates.

Step c: crushing the brittle intermediates obtained from step b, and the obtained powder being screened to obtain powder of the intermediates through sieve. The screen size being 180 mesh to 230 mesh, preferably 200 mesh of Taylor standard sieve.

Step d: the powder of the intermediates obtained from step c being calcined at 600° C.-800° C. for 0.8-3 hours, after calcination, the carbon nanotubes being obtained.

In a more preferred embodiment of the present invention, the present invention provides a method for the preparation of multi-walled carbon nanotubes comprising the steps of:

Step a: the waste PET packaging materials being cut into sheets to obtain waste PET sheets. And the obtained waste PET sheets being washed with distilled water or deionized water and filtered. And the waste PET sheets are repeatedly cleaned for several times and filtered; After naturally drying, the PET sheets being treated with vacuum drying at vacuum degree of 0.02-0.08 MPa and temperature of 40-60° C.

Step b: 10 to 40 parts by weight of the waste PET sheets, 8-45 parts by weight of alcohol, 0.3-5 parts by weight of the catalysts, mixing the waste PET sheets obtained from step a with alcohol to form alcoholysis reaction system at 150° C.-170° C., after 30-60 minutes, the temperature is adjusted to 200° C.-220° C., and a part of the catalyst, preferably half of the catalyst being dropwise added to the system. The system being reacted for 5-7 hours under stirring with speed range of 200 rmp-300 rmp. The remaining catalyst being added to the reaction system for the second time. Adjusting the speed to the speed range of 400 rmp-600 rmp, the system being continued to react for 2-5 hours, and finally the reaction system continuing to react at 20-35° C., preferably at room temperature until the PET sheets turning into intermediate sheets which are from transparent to milky white or white. The intermediates and the alcoholysis products being obtained.

Step c: the intermediates being separated from step b, and washed with anhydrous ethanol and deionized water alternately for 5-20 times, and then the intermediates being vacuum dried for 40-60 hours at vacuum degree of 0.02-0.08 MPa and temperature of 40-60° C. to obtain the brittle intermediates.

Step d: the brittle intermediates obtained from step c being crushed, and put into a high-speed universal crusher. The brittle intermediates being continuously crushed for 3 to 15 minutes by adjusting the speed to 5000 to 15000 rpm to obtain the powder. The crushed powder being screened to obtain powder of the intermediates through sieve. The screen size being 180 mesh to 230 mesh, preferably 200 mesh of Taylor standard sieve.

Step e: the powder of the intermediates obtained from step d being mixed with deionized water and then put into the centrifuge. The powder of the intermediates being washed at a speed of 3000 to 8000 rpm. The underlayer precipitation being took and washed repeatedly for 3-8 times to remove catalyst or small molecules substance such as alcohol which is probably present in the precipitation as much as possible. The precipitation being dried to obtain the white powder.

Step f: the white powder obtained from step e being calcined continuously at 600-800° C. for 0.8 to 3 hours, and then cooling down to room temperature to obtain the carbon nanotubes.

In a most preferred embodiment of the present invention, the present invention provides a method for the preparation of multi-walled carbon nanotubes with good conductivity by waste PET bottles comprising the steps of:

Step a: the recycling waste PET bottles being cut into 2-5 mm width sheets and placed in a beaker. Distilled water being poured into the beaker and stirred with a glass bar. Cleaning the beaker in the ultrasonic cleaning machine for 30 minutes, and then pouring out the waste PET sheets from the beaker. The waste PET sheets being filtered by using 120 mesh sieve and removed moisture. The above process being repeated for 5 times, and finally the waste PET sheets being put in 120 mesh sieve for drying. After naturally drying for 24 hours, the PET sheets being treated with vacuum drying at vacuum degree of 0.05 MPa and temperature of 50° C. for 8 hours.

Step a is to remove the impurities on the surface of the waste PET. As long as the surface can be cleaned, any method such as plasma cleaning method can be used.

Step b: the PET sheets by weight and alcohol by weight together being added in a container with a stirring apparatus, mixing at 150° C.-170° C. by stirring. After 30-60 minutes, the temperature being adjusted to 200° C.-220° C. Half of the catalyst being added to the system, and the system being reacted for 5-7 hours under stirring at speed range of 200 rmp-300 rmp.

Step c: the remaining catalyst being added to the reaction system for the second time. Adjusting the speed with range of 400 rmp-600 rmp, the reaction system being continued to react for 3 hours. Then the reaction system being stirred at room temperature until the PET sheets turning into intermediate sheets which are from transparent to milky white or white.

Step d: after the reaction being completed at room temperature, stopping stirring. The intermediate sheets being took out of the reaction product and washed with anhydrous ethanol and deionized water alternately for 10 times in a 120 mesh sieve. Then the intermediate sheets being vacuum dried for 48 hours at vacuum degree of 0.05 MPa and temperature of 50° C. to obtain the brittle intermediate sheets.

Step e: the intermediate sheets obtained from step d being put in a universal pulverizer, and crushed continuously for 5 minutes by adjusting the speed to 10000 rpm to obtain powder of the intermediates, and the crushed powder being screened in a 180-230 mesh sieve to obtain powder of the intermediates through sieve for the following step.

Step f: the screened powder being took out of step e, and mixed with deionized water to obtain a mixture. Then the mixture being put in a centrifuge. The powder of the intermediates being washed at the speed of 6000 rpm to obtain the underlayer precipitation. The above process being repeated for 5 times to remove the possible catalyst or small alcohol molecule as much as possible. The powder of the intermediates being dried to obtain the white powder.

Step g: the white powder of step f being placed in a porcelain crucible, then put in a high-temperature furnace, and calcined continuously at 600-800° C. by aerating nitrogen as a protective gas. The temperature being keeping for 1 hours, then cooling down to room temperature. Integrated block array multi-wall carbon nanotubes with low aspect ratio and good conductivity being obtained.

Wherein, the integrated block (i.e. the carbon nanotubes) exhibits an integrated array distribution shape on a base plane.

The inventors have studied the reaction of alcoholysis process of PET materials:

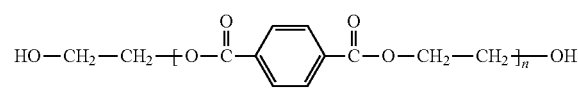

is the molecular chain structure of PET. It can react with two alcohols of neopentyl glycol and and dipropylene glycol by alcoholysis reaction to generate diol compounds with reactive hydroxyl, and the reaction principle is shown in the following reactions (1) and (2):

Reaction (1)

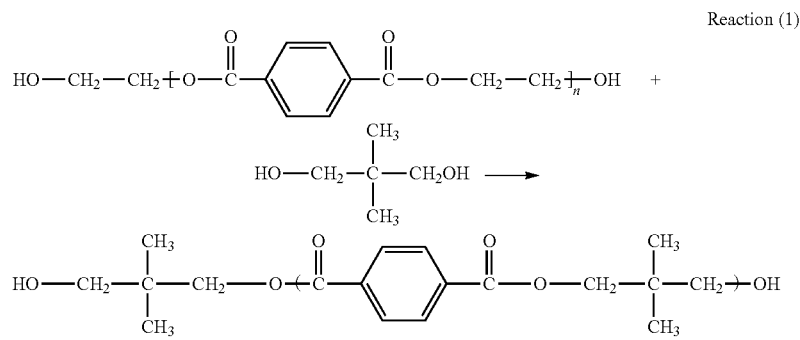

Reaction (2)

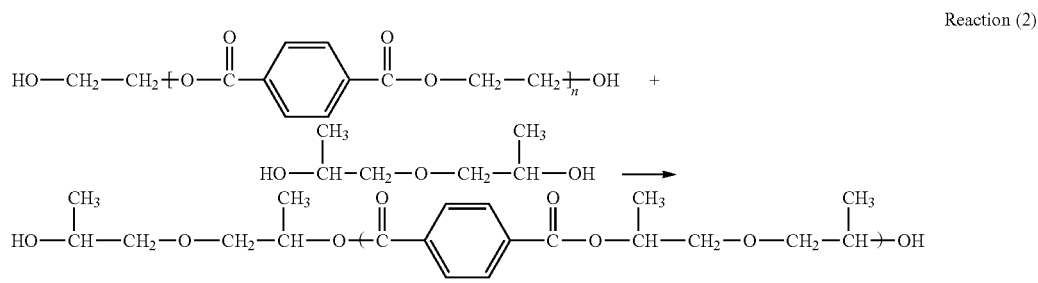

If the PET materials are completely carried out alcoholysis, they will completely turn into liquid. The reaction process needs to be controlled in present invention. When the reaction between PET materials and alcohols is not finished and the PET materials are not completely turned into liquid, the intermediates are taken out in time, which are used as raw materials for the subsequent production of the carbon nanotubes.

The preparation method of the carbon nanotubes of the present invention is described by specific embodiments, and the carbon nanotubes are detected.

The reagents and instruments used in the examples below are as follows:

TABLE 1

Instrument and reagents used in the examples

| Reagent/Instrument | Model | Manufactor |
| --- | --- | --- |
| PET | Recycled plastic bottles | Nongfu spring, master kong |
| neopentyl glycol | Analytical reagent, CAS: 126-30-7 | Tianjin Guangfu Fine Chemical Research Institute |
| dipropylene glycol | Analytical reagent, CAS: 25265-71-8 | Tianjin Guangfu Fine Chemical Research Institute |
| PEG 2000 | Analytical reagent, CAS: 25322-68-3 | Shanghai Jingchun reagent Co., Ltd |
| butyl titanate | Analytical reagent, CAS: 5593-70-4 | Shanghai Qingxi Chemical Technology Co Ltd |
| dibutyltin oxide | Analytical reagent, CAS: 818-08-6 | Shanghai Jingchun reagent Co., Ltd |
| Absolute ethanol | Analytical reagent, CAS: 64-17-5 | Tianjin Fuyu Fine Chemical Co., Ltd. |
| Ultrasonic cleaning machine | KQ3200DE | Kunshan Ultrasonic Instrument Co., Ltd. |
| Oil bath | DF-101S | Shaanxi Taikang biotechnology Co., Ltd |
| vacuum drying oven | ZK | Beijing Kewei Yongxing Instrument Co. Ltd |
| Universal pulverizer | FW-100 | Shanghai Xinnuo Industrial Co., Ltd |
| Centrifuge | H1850 | Changsha Xiangyi Centrifuge Instrument Co., Ltd |
| High temperature furnace | GSL-1400X | Hefei Kejing Materials Technology Co., Ltd |
| Raman spectrometer | LabRAM HR800 | Horiba Jobin Yvon Company |
| Volometer | VC97 | Victor (HONG KONG) Electronics Co., Ltd |
| Field emission scanning electron microscope | Hitachi SU8000 | Hitachi Co. Ltd. |
| High resolution transmission electron microscopy | JEM-3010 | JEOL | and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, neopentyl glycol and and dipropylene glycol together were added in a three-necked flask with a stirring apparatus, mixing in an oil bath at 150° C. by stirring. After 30 minutes, the temperature was adjusted to 200° C. Half of tetrabutyl titanate was dropwise added to the system, and the system was reacted for 6 hours under stirring.

Example 1

MWCNTs were prepared by adding raw materials of Table 2, wherein NPG was neopentyl glycol and DPG was dipropylene glycol.

TABLE 2

| Raw materials (g) | | | |
| --- | --- | --- | --- |
| Waste PET | NPG | DPG | Tetrabutyl titanate |
| 30 | 20 | 15 | 2 |

Preparation Method:

Step a: the recycling waste PET bottles were cut into 2 mm×2 mm sheets and placed in a beaker. Distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve Step c: the remaining tetrabutyl titanate was dropwise added to the reaction system. Increasing the stirring speed, the reaction system was continued to react in the oil bath for 3 hours. The three-necked flask was then taken out of the oil bath and the reaction system was continued to stir for 6 hours at room temperature.

Step d: after the reaction was completed at room temperature, stopped stirring. The incompletely reacted intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in a universal pulverizer, and crushed for 5 minutes by adjusting the speed to 10000 rpm to obtain the powder of the intermediates. And the crushed powder was screened in a 180 mesh sieve to obtain powder of the intermediates through sieve for the following step.

Step f: the screened powder was took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain white powder.

Step g: the white powder of step f was placed in the porcelain crucible, then put in the high-temperature furnace, and calcined continuously at 600° C. The porcelain crucible was took out of the high-temperature furnace, wherein black flake products existed.

It was tested that the products were integrated block array multi-walled carbon nanotubes with low aspect ratio and good conductivity.

The products were detected by Raman spectroscopy. As shown in FIG. 1, typical D peak and
G peak of the carbon nanotubes appeared at 1312 cm$^{-1}$ and 1585 cm$^{-1}$ respectively, proving that the products were the carbon nanotubes.

Figure 2:
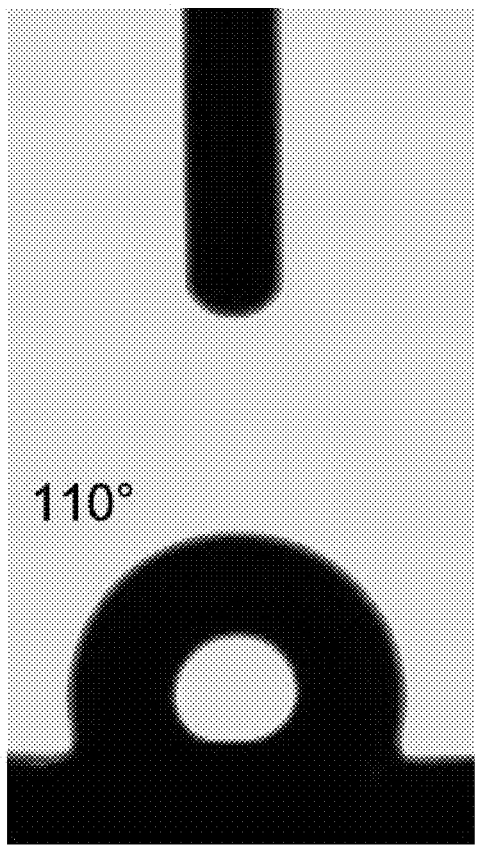
FIG. 2 is a contact angle photograph of dripping of the carbon nanotubes prepared by Example 1 of the present invention
Figure 3:
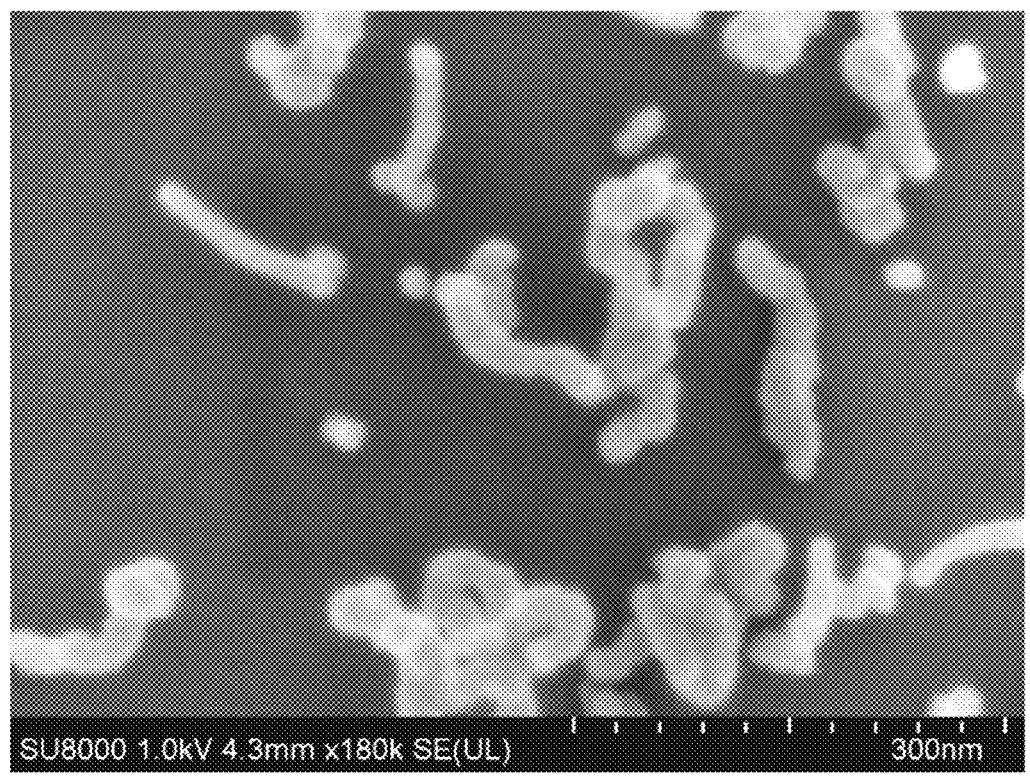
FIG. 3 is a scanning electron microscopy (SEM) diagram of the carbon nanotubes prepared by Example 1 of the present invention.
Figure 4:
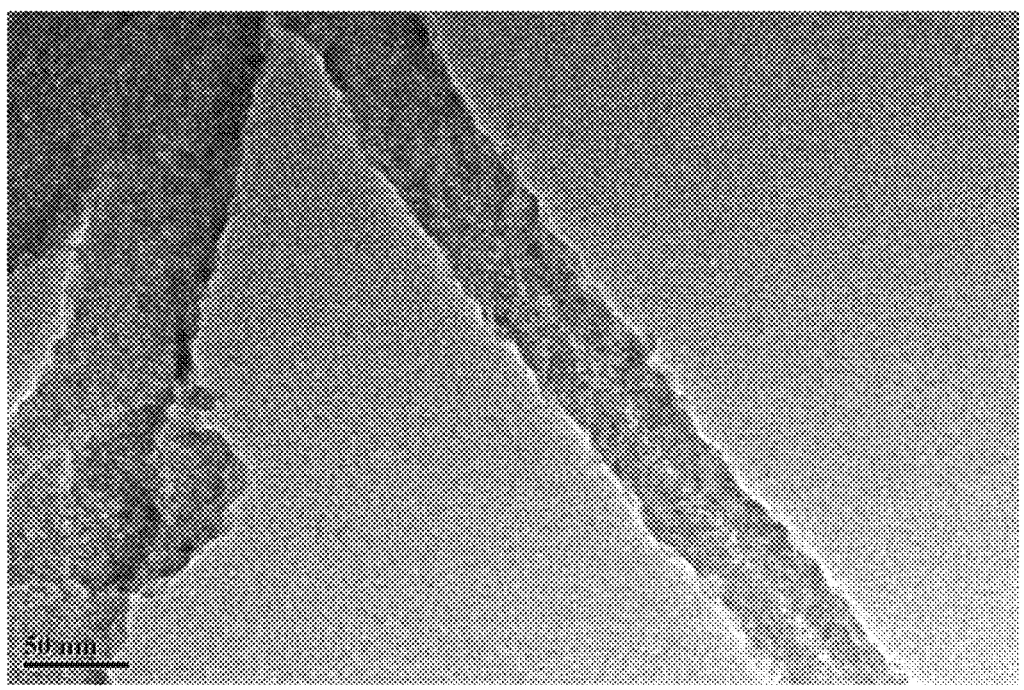
FIG. 4 is a transmission electron microscopy (TEM) diagram of the carbon nanotubes prepared by Example 1 of the present invention.

Observed by FSEM and HRTEM, as shown in FIG. 3 whose magnification times was 180K and FIG. 4, the products were nanotubes. In FIG. 3, the light colored part represented the carbon nanotubes, and by cross sectional examination, it was found that the dark part at the bottom of the picture represented the aggregation of the carbon nanotubes. As shown in FIG. 2, the contact angle of the carbon nanotubes reached 110°. The carbon nanotubes were hydrophobic. The resistance of black flake carbon nanotubes was comprehensively detected by four point resistance tester and multimeter, and the resistance was 117Ω-214Ω, proving that the resistance value was low, and the conductivity was good.

Example 2

MWCNTs were prepared by adding raw materials of Table 3.

TABLE 3

| Raw materials (g) | | | |
| --- | --- | --- | --- |
| Waste PET | NPG | DPG | Tetrabutyl titanate |
| 10 | 8 | 6 | 0.5 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh screen to filter and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, the neopentyl glycol and and dipropylene glycol together were added in a three-necked flask with a stirring apparatus, mixing in an oil bath at 170° C. by stirring. After 60 minutes, the temperature was adjusted to 220° C. Half of tetrabutyl titanate was dropwise added to the system and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction system was continued to stir for 6 hours at room temperature.

Step d: after the reaction was completed at room temperature, stopped stirring. The intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed continuously for 5 minutes by adjusting the speed to 10000 rpm to obtain the powder. And the crushed powder was screened in a 200 mesh sieve to obtain the powder of the intermediates through sieve for the following step.

Step f: the screened powder was took out of step e, and mixed with deionized water to obtain a mixture. Then the mixture was put in the centrifuge. The powder was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 800° C. to obtain integrated block array multi-walled carbon nanotubes with low aspect ratio and good conductivity.

Figure 5:
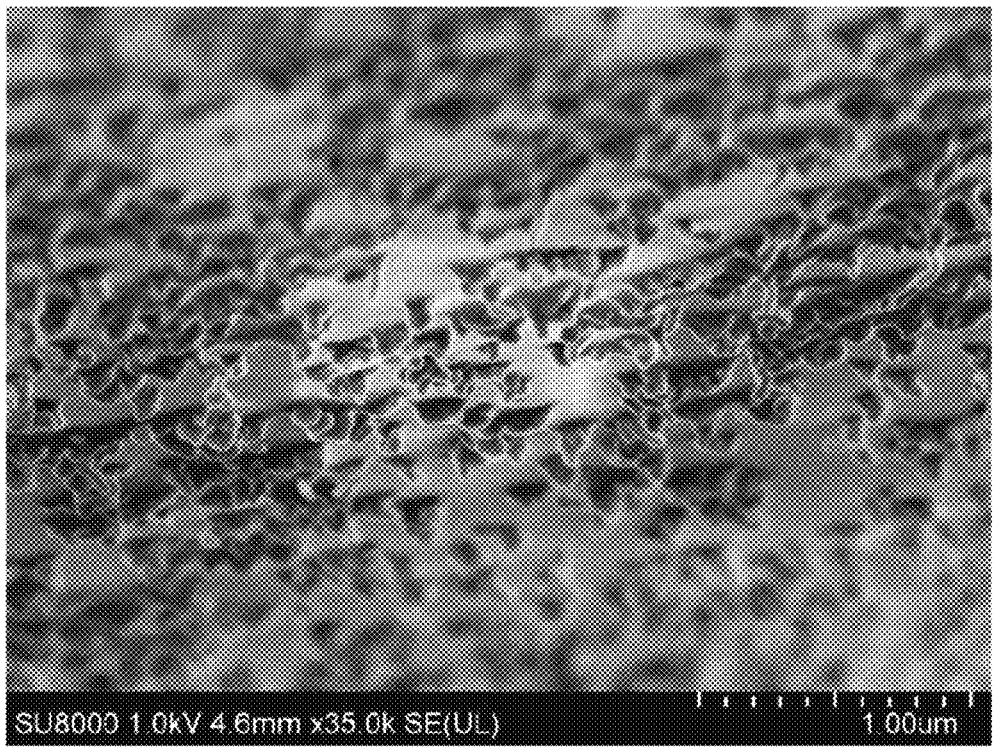
FIG. 5 is a scanning electron microscopy (SEM) diagram of the carbon nanotubes prepared by Example 2 of the present invention.
Figure 6:
FIG. 6 is a transmission electron microscopy (TEM) diagram of the carbon nanotubes prepared by Example 2 of the present invention.

Observed by FSEM and HRTEM, as shown in FIG. 5 whose magnification times was 35K and FIG. 6, the products were the nanotubes. The prominence in FIG. 5 represented the small carbon nanotubes, and the yield of the carbon nanotubes was higher in the present example. On the other hand, the resistance was detected by the multimeter, and the resistance was 84Ω-125Ω, proving that the resistance value was low, and the conductivity was good.

Example 3

MWCNTs were prepared by adding raw materials of Table 4.

TABLE 4

| Raw materials (g) | | | |
| --- | --- | --- | --- |
| Waste PET | NPG | DPG | Tetrabutyl titanate |
| 15 | 15 | 10 | 1.5 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve, and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets by weight, neopentyl glycol and and dipropylene glycol together were added in a three-necked flask with a stirring apparatus, mixing in an oil bath at 160° C. by stirring. After 40 minutes, the temperature was adjusted to 210° C. Half of tetrabutyl titanate was dropwise added to the system, and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction was continued to stir for 6 hours at room temperature.

Step d: after the reaction was completed at room temperature, stopped stirring. The intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed for 5 minutes by adjusting the speed to 10000 rpm to obtain the powder. And the crushed powder was screened in a 230 mesh sieve to obtain the powder of the intermediates through sieve for the following step.

Step f: the screened powder was took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 700° C. to obtain integrated block array multi-walled carbon nanotubes with low aspect ratio and good conductivity.

Figure 7:
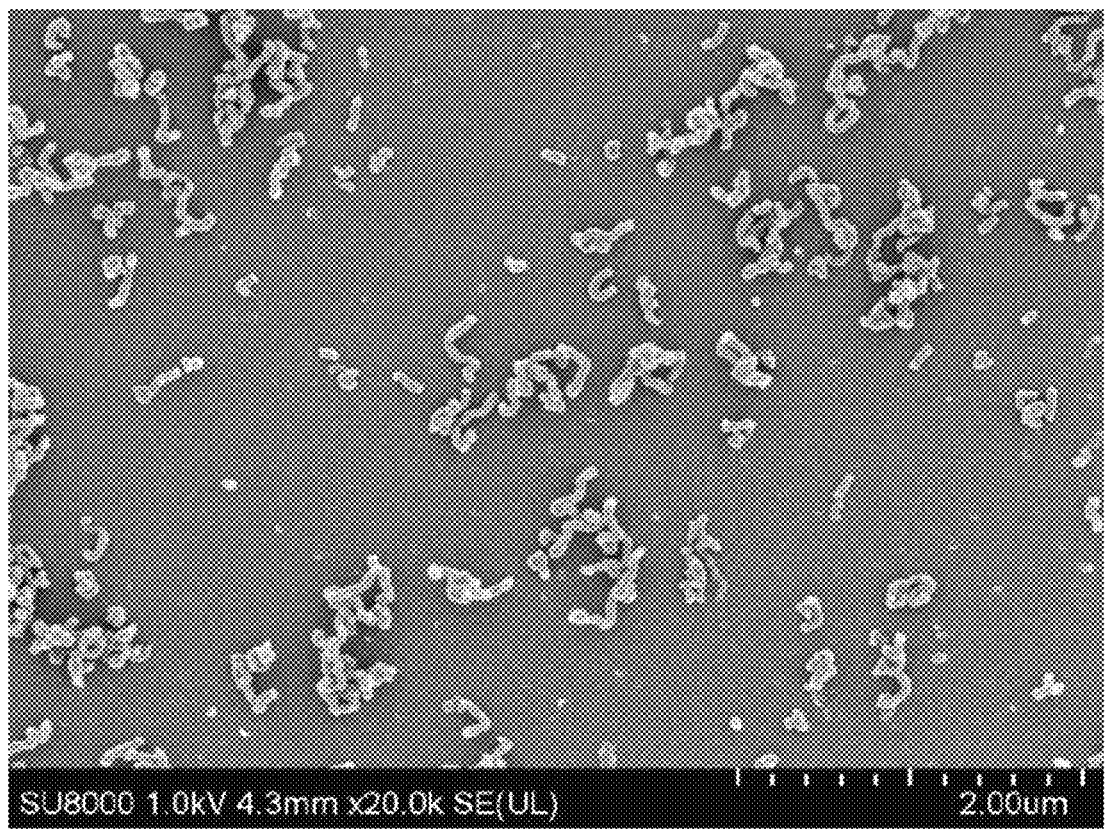
FIG. 7 is a scanning electron microscopy (SEM) diagram of the carbon nanotubes prepared by Example 3 of the present invention.
Figure 8:
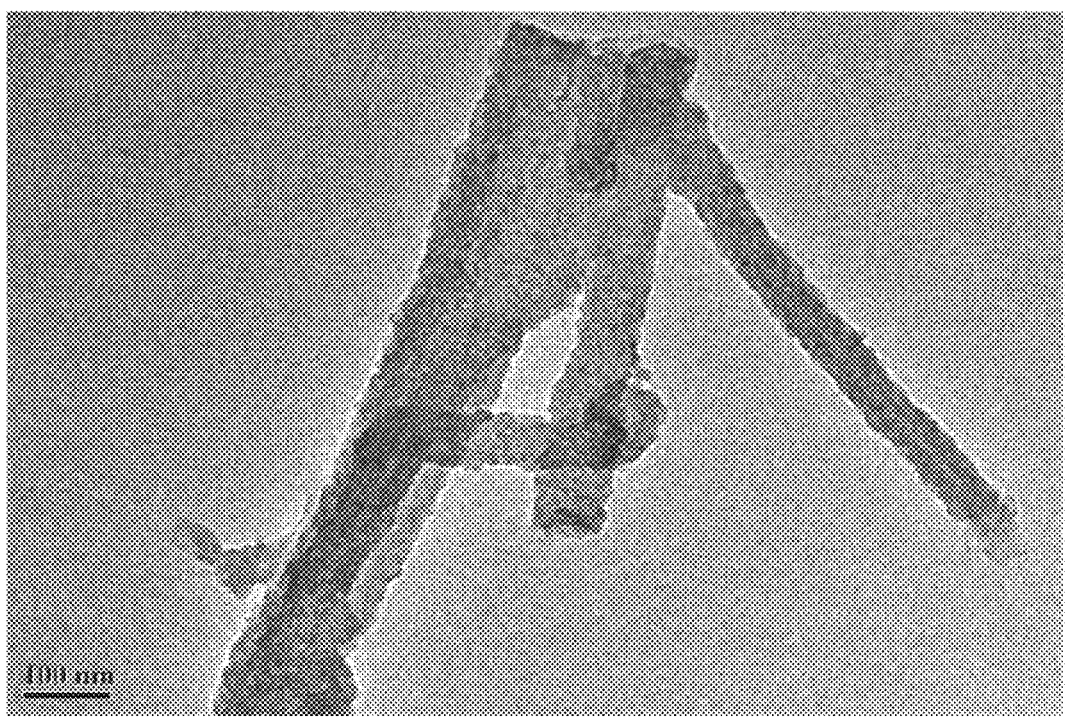
FIG. 8 is a transmission electron microscopy (TEM) diagram of the carbon nanotubes prepared by Example 3 of the present invention.

As shown in FIG. 7 whose magnification times was 20K and FIG. 8, the products were the nanotubes. On the other hand, the resistance was detected by the multimeter, and the resistance was 23Ω-145Ω, proving that the resistance value was low, and the conductivity was good.

Example 4

MWCNTs were prepared by adding raw materials of Table 5.

TABLE 5

| Raw materials (g) | | | |
| --- | --- | --- | --- |
| Waste PET | NPG | DPG | Tetrabutyl titanate |
| 10 | 5 | 3 | 5 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve, and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, neopentyl glycol and and dipropylene glycol together were added in a three-necked flask with a stirring apparatus, mixing in an oil bath at 150° C. by stirring. After 30 minutes, the temperature was adjusted to 200° C. Half of tetrabutyl titanate was dropwise added to the system, and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction was continued to stir for 6 hours at room temperature.

Step d: after the reaction was completed at room temperature, stopped stirring. The intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed continuously for 5 minutes by adjusting the speed to 10000 rpm to obtain the powder. And the crushed powder was screened in a 200 mesh sieve to obtain the powder of the intermediate through sieve for the following step.

Step f: the screened powder was took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 600° C. to obtain integrated block array multi-walled carbon nanotubes with low aspect ratio and good conductivity.

Figure 9:
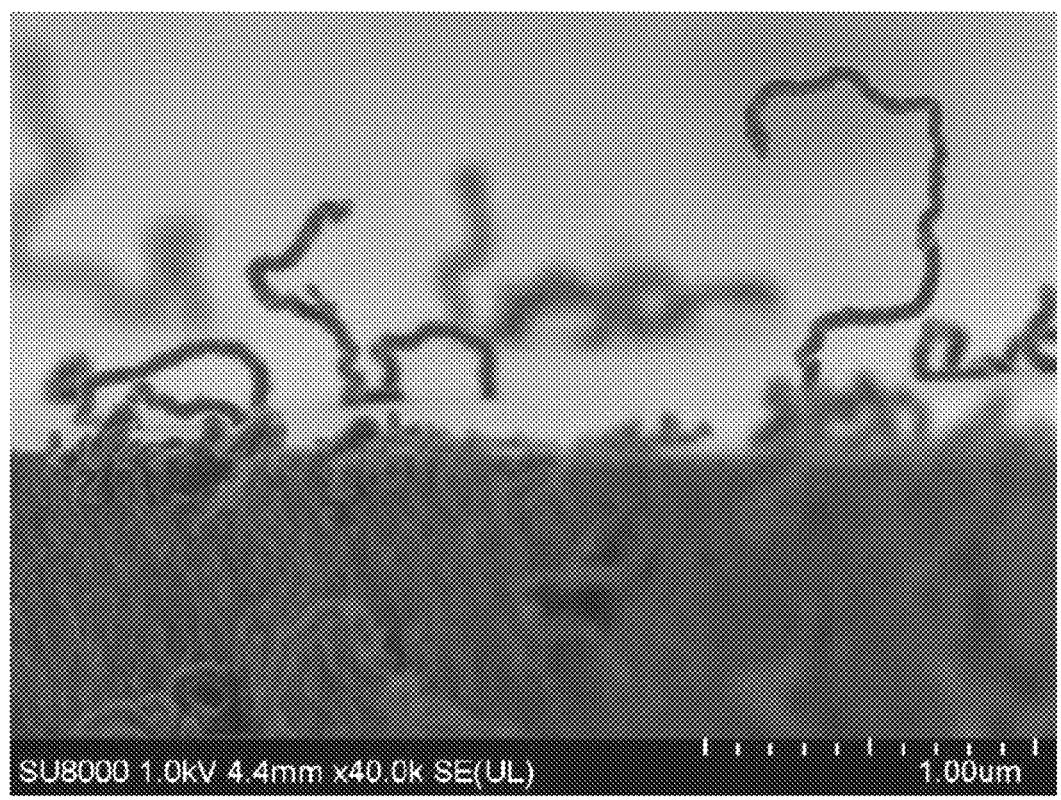
FIG. 9 is a scanning electron microscopy (SEM) diagram of the carbon nanotubes prepared by Example 4 of the present invention.
Figure 10:
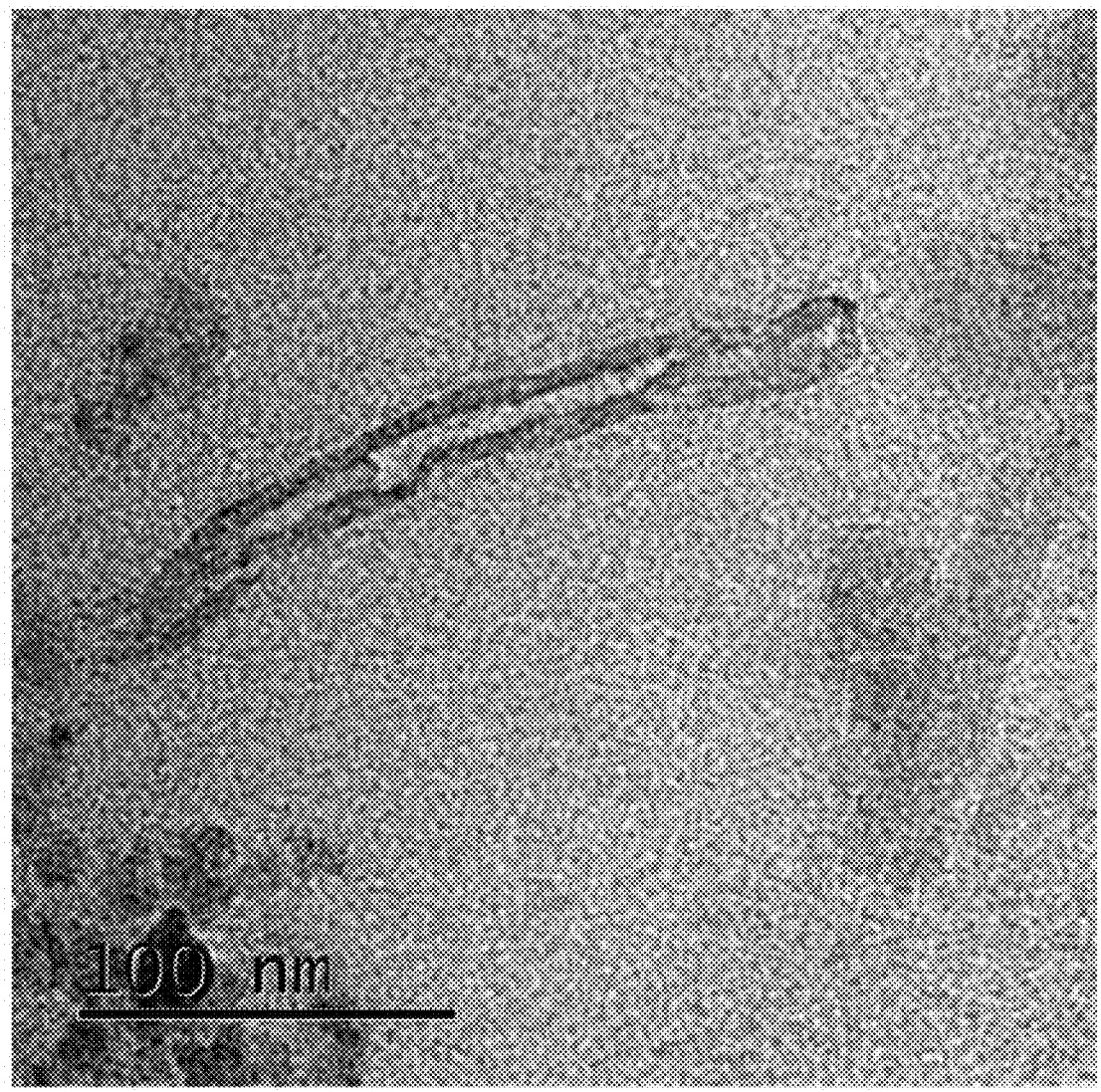
FIG. 10 is a transmission electron microscopy (TEM) diagram of the carbon nanotubes prepared by Example 4 of the present invention.

Observed by FSEM and HRTEM, as shown in FIG. 9 whose magnification times was 40K and FIG. 10, the products were the nanotubes. On the other hand, the resistance was detected by the multimeter, and the resistance was 101Ω-165Ω, proving that the resistance value was low, and the conductivity was good.

Example 5

MWCNTs were prepared by adding raw materials of Table 6.

TABLE 6

| Raw materials (g) | | | |
| --- | --- | --- | --- |
| Waste PET | NPG | DPG | Tetrabutyl titanate |
| 40 | 25 | 20 | 0.3 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve, and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, neopentyl glycol and and dipropylene glycol together were added in a three-necked flask with a stirring apparatus, mixing in an oil bath at 150° C. by stirring. After 30 minutes, the temperature was adjusted to 200° C. Half of tetrabutyl titanate was dropwise added to the system, and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction was continued to stir for 6 hours at room temperature.

Step d: after the reaction was completed at room temperature, stopped stirring. The incompletely reacted intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed continuously for 5 minutes by adjusting the speed to 10000 rpm to obtain the powder. And the crushed powder was screened in a 200 mesh sieve to obtain the powder of the intermediates through sieve for the following step.

Step f: the screened powder was took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 800° C. to obtain integrated block array multi-walled carbon nanotubes with low aspect ratio and good conductivity.

Figure 11:
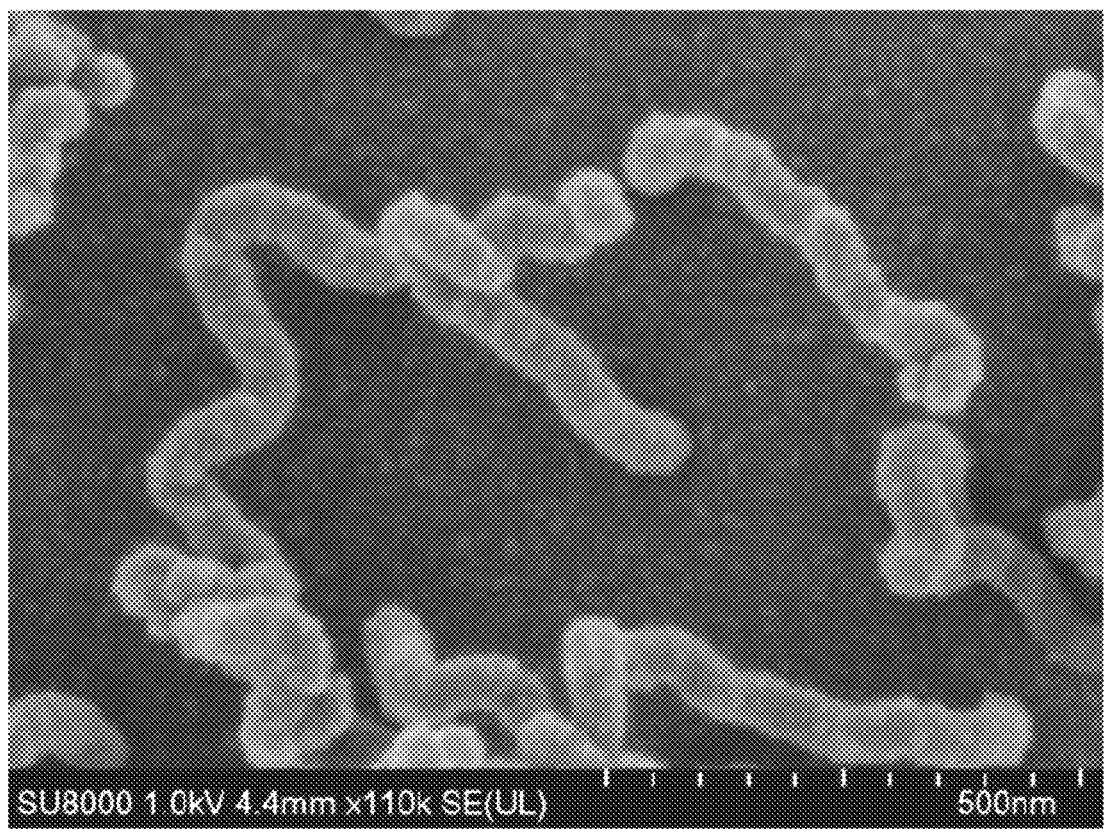
FIG. 11 is a scanning electron microscopy (SEM) diagram of the carbon nanotubes prepared by Example 5 of the present invention.
Figure 12:
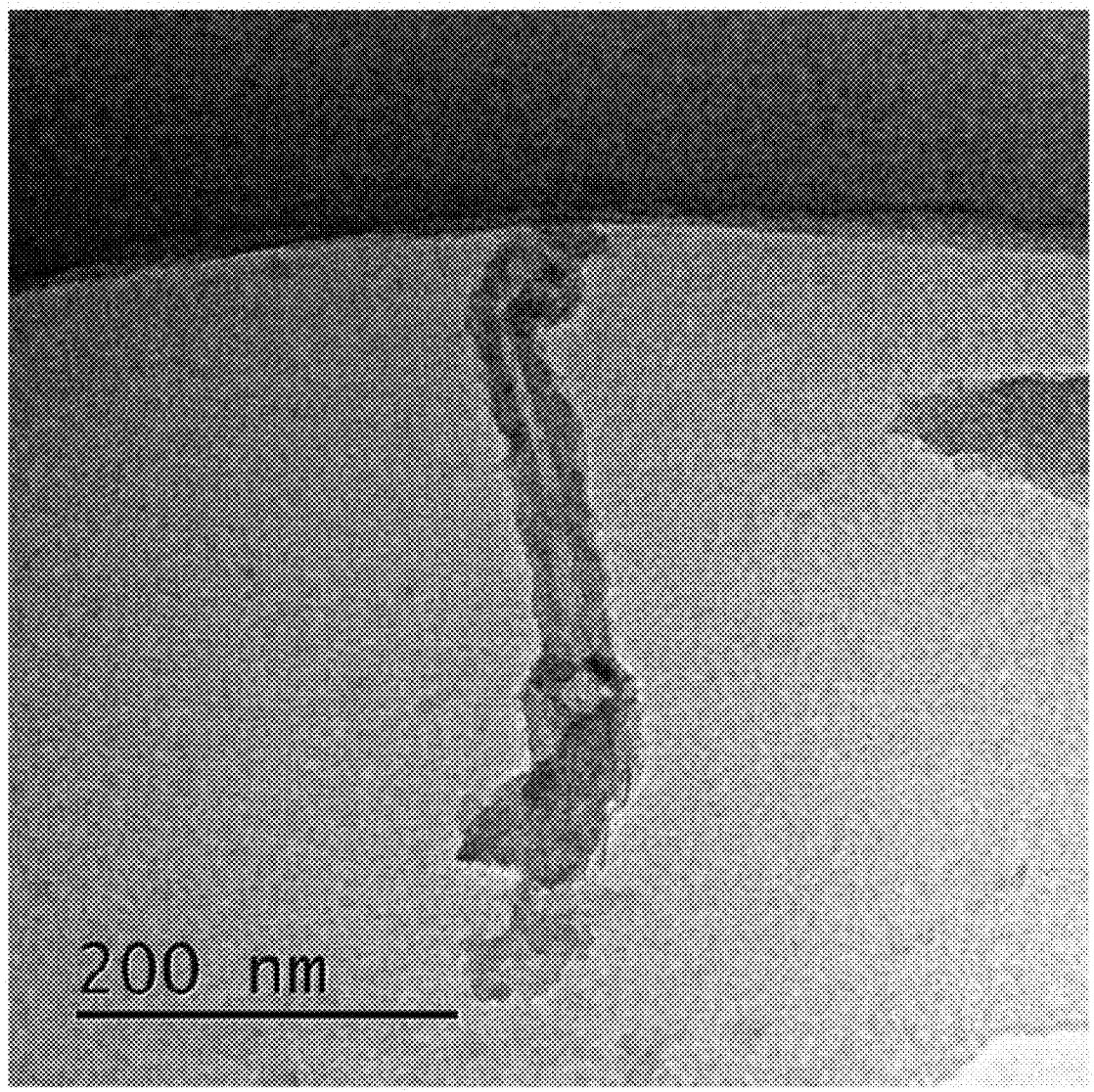
FIG. 12 is a transmission electron microscopy (TEM) diagram of the carbon nanotubes prepared by Example 5 of the present invention.

Observed by FSEM and HRTEM, as shown in FIG. 11 whose magnification times was 110K and FIG. 12, the products were the nanotubes. On the other hand, the resistance was detected by the multimeter, and the resistance was 56Ω-152Ω, proving that the resistance value was low, and the conductivity was good.

Example 6

MWCNTs were prepared by adding raw materials of Table 7.

TABLE 7

| Raw materials (g) | | | |
| --- | --- | --- | --- |
| Waste PET | NPG | DPG | Tetrabutyl titanate |
| 10 | 25 | 20 | 5 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve, and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, neopentyl glycol and and dipropylene glycol together were added in a three-necked flask with a stirring apparatus, mixing in an oil bath at 150° C. by stirring. After 30 minutes, the temperature was adjusted to 200° C. Half of tetrabutyl titanate was dropwise added to the system, and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction was continued to stir for 6 hours at room temperature.

Step d: after the reaction was completed at room temperature, stopped stirring. The intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed continuously for 5 minutes by adjusting the speed to 10000 rpm to obtain the powder, and the crushed powder was screened in a 200 mesh sieve to obtain the powder of the intermediate through sieve for the following step.

Step f: the screened powder were took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 800° C. to obtain integrated block array multi-wall carbon nanotubes with low aspect ratio and good conductivity.

Figure 13:
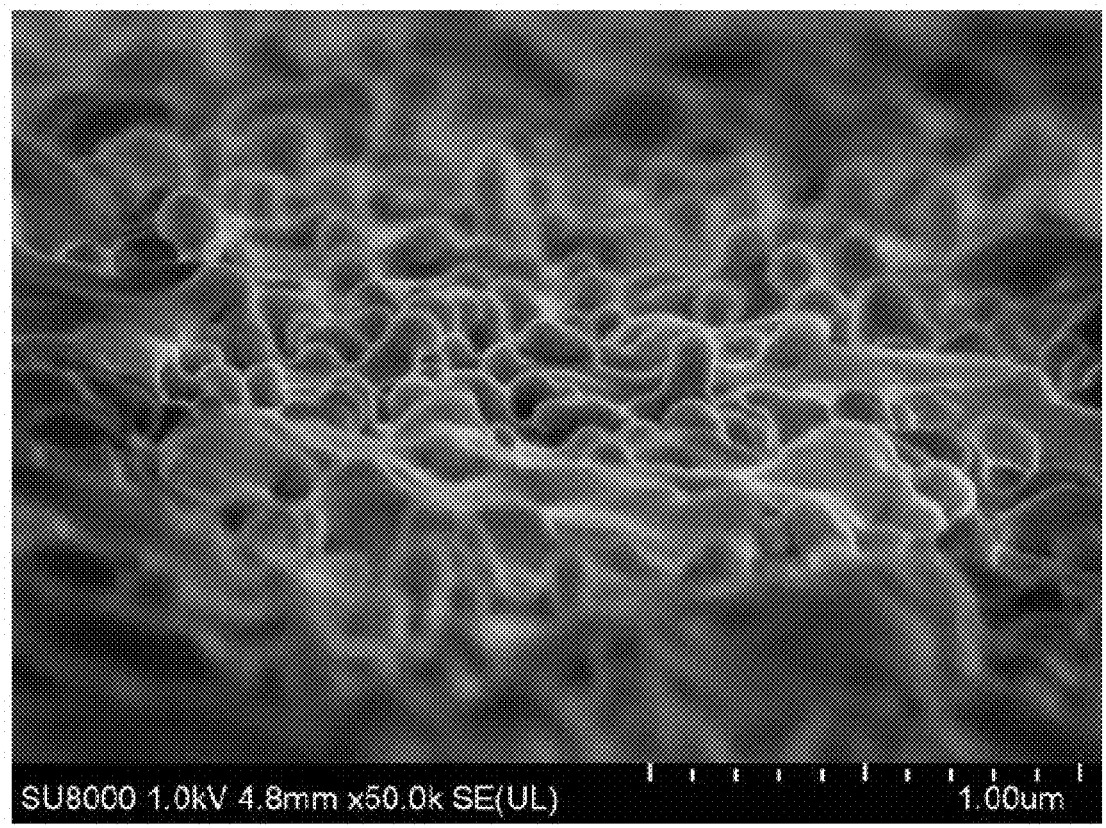
FIG. 13 is a scanning electron microscopy (SEM) diagram of the carbon nanotubes prepared by Example 6 of the present invention.
Figure 14:
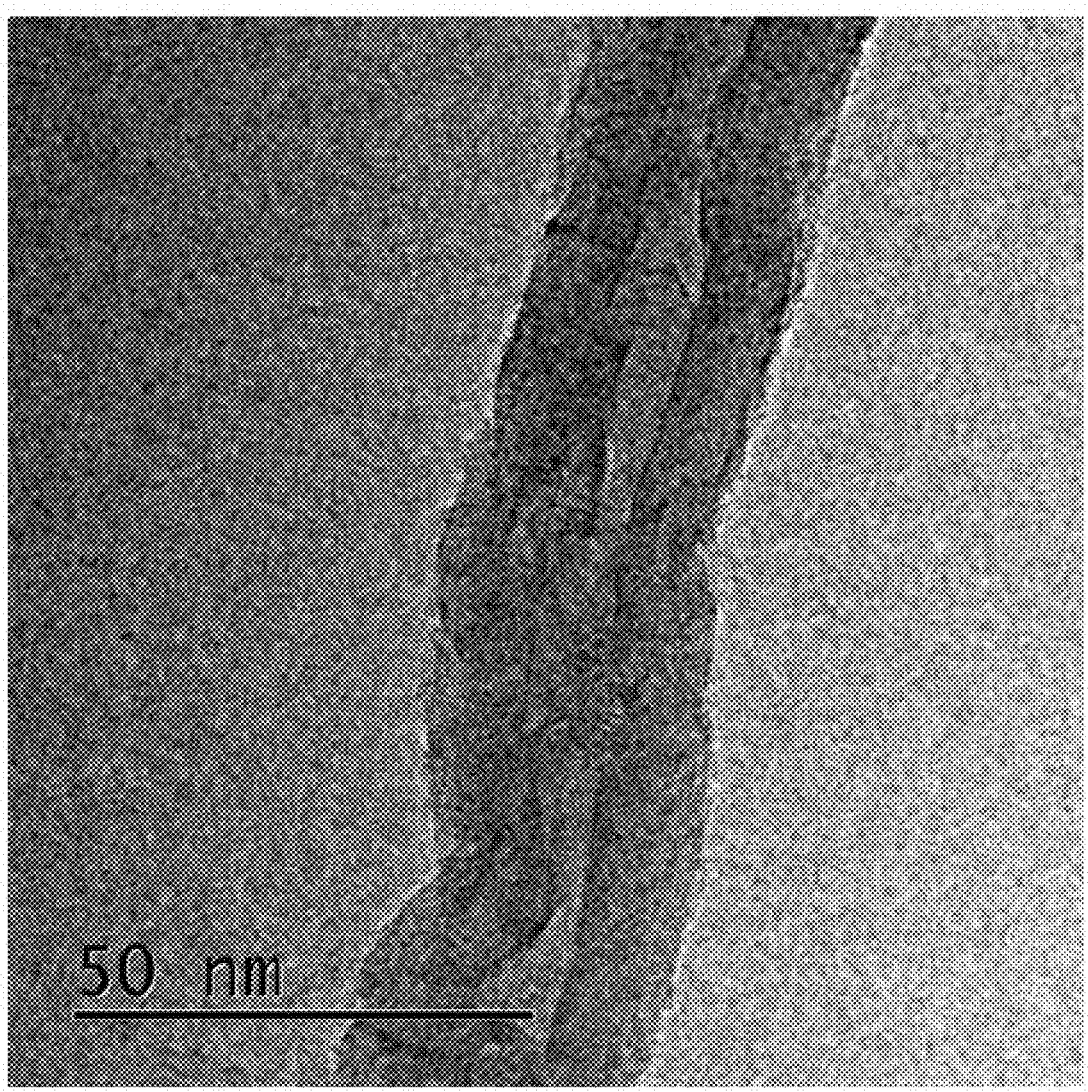
FIG. 14 is a transmission electron microscopy (TEM) diagram of carbon nanotubes prepared by Example 6 of the present invention.

Observed by FSEM and HRTEM, as shown in FIG. 13 whose magnification times was 50K and FIG. 14, the products were the nanotubes. On the other hand, the resistance was detected by the multimeter, and the resistance was 94Ω-218Ω, proving that the resistance value was low, and the conductivity was good.

Example 7

MWCNTs were prepared by adding raw materials of Table 8.

TABLE 8

| Raw materials (g) | | | |
| --- | --- | --- | --- |
| Waste PET | NPG | DPG | Tetrabutyl titanate |
| 40 | 5 | 3 | 2.5 |

Preparation Method:

Step a: the recycling waste PET bottles were cut into 2 mm×2 mm sheets and placed in a beaker. The distilled water was poured into the beaker and stirred with a glass bar. Cleaned the beaker in the ultrasonic cleaning machine for 30 minutes, and then poured out the waste PET sheets from the beaker. The waste PET sheets were filtered by using 120 mesh sieve, and removed moisture. The above process was repeated for 5 times. Finally the waste PET sheets were put in 120 mesh sieve for drying. After naturally drying for 24 hours, the PET sheets were treated with vacuum drying at vacuum degree of 0.05 MPa and temperature of 50° C. for 8 hours.

Step b: the waste PET sheets, neopentyl glycol, and dipropylene glycol together were added in a three-necked flask with a stirring apparatus, mixing in an oil bath at 150° C. by stirring. After 30 minutes, the temperature was adjusted to 200° C. Half of tetrabutyl titanate was dropwise added to the system, and the system was reacted for 6 hours under stirring.

Step c: the remaining tetrabutyl titanate was dropwise added to the reaction system. Increasing the stirring speed, the reaction system was continued to react in the oil bath for 3 hours. The three-necked flask was then taken out of the oil bath and the reaction was continued to stir for 6 hours at room temperature.

Step d: after the reaction was completed at room temperature, stopped stirring. The intermediate sheets were took out of the reaction product, and washed with anhydrous ethanol and deionized water alternately for 10 times in a 120 mesh sieve. Then the intermediate sheets were vacuum dried for 48 hours at vacuum degree of 0.05 MPa and temperature of 50° C. to obtain the brittle intermediate sheets.

Step e: the intermediate sheets obtained from step d were put in the universal pulverizer, and crushed continuously for 5 minutes by adjusting the speed to 10000 rpm to obtain the powder, and the crushed powder was screened in a 200 mesh sieve to obtain the powder of the intermediates through sieve for the following step.

Step f: the screened powder were took out of step e, and mixed with deionized water to obtain a mixture. Then the mixture was put in the centrifuge. The powder of the intermediates was washed at the speed of 6000 rpm to obtain the underlayer precipitation. The above process was repeated 5 times to obtain the white powder.

Step g: the white powder of step f was placed in the porcelain crucible, then put in the high temperature furnace, and calcined continuously at 800° C. to obtain integrated block array multi-walled carbon nanotubes with low aspect ratio and good conductivity.

Figure 15:
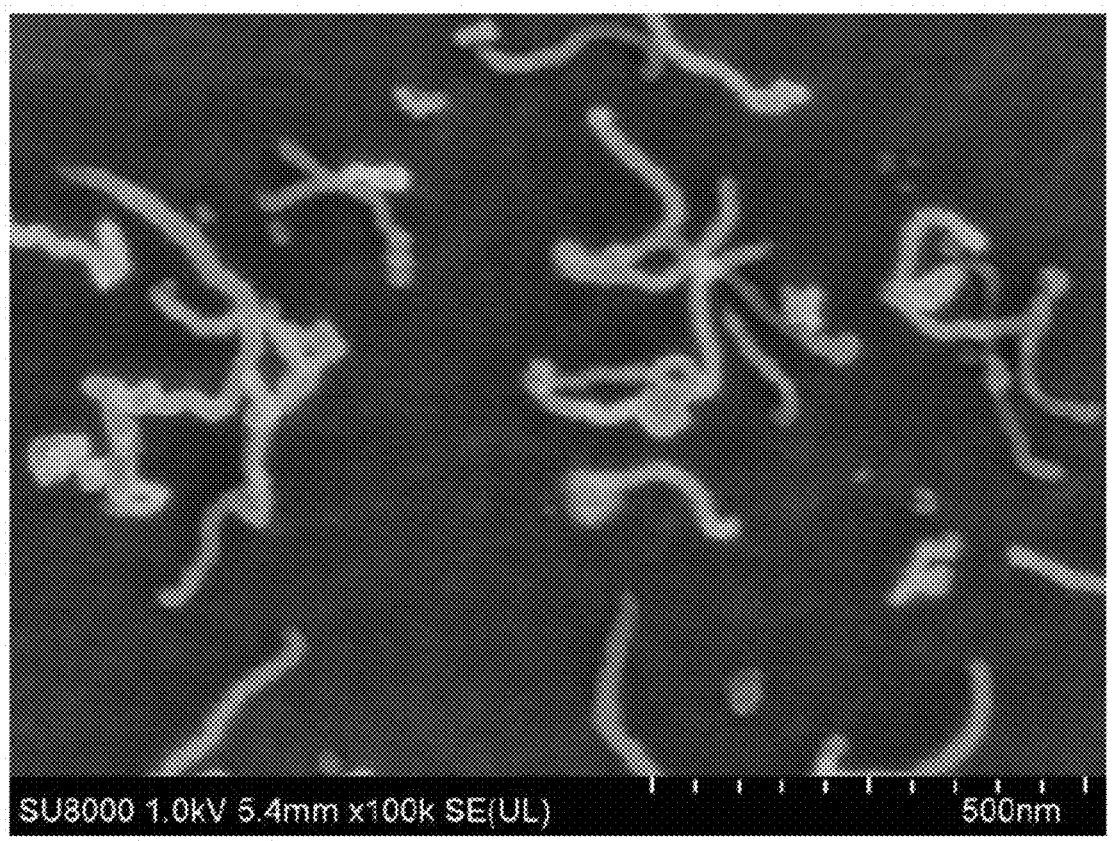
FIG. 15 is a scanning electron microscopy (SEM) diagram of the carbon nanotubes prepared by Example 7 of the present invention.
Figure 16:
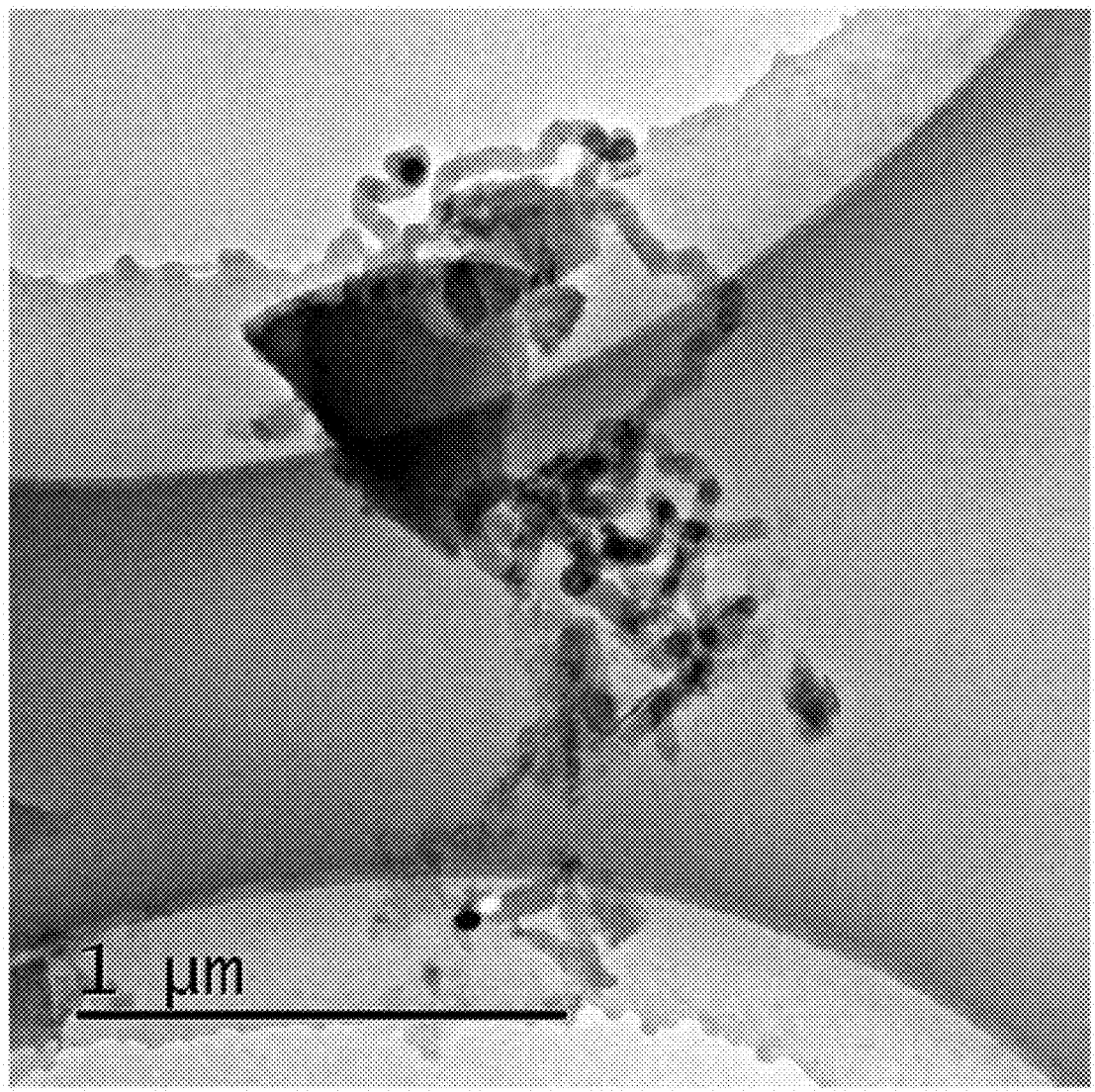
FIG. 16 is a transmission electron microscopy (TEM) diagram of the carbon nanotubes prepared by Example 7 of the present invention.

Observed by FSEM and HRTEM, as shown in FIG. 15 whose magnification times was 100K and FIG. 16, the products were the nanotubes. On the other hand, the resistance was detected by the multimeter, and the resistance was 87Ω-212Ω, proving that the resistance value was low, and the conductivity was good.

Example 8

The difference from Example 7 was that: dibutyltin oxide was used as catalyst instead of titanate.

Figure 17:
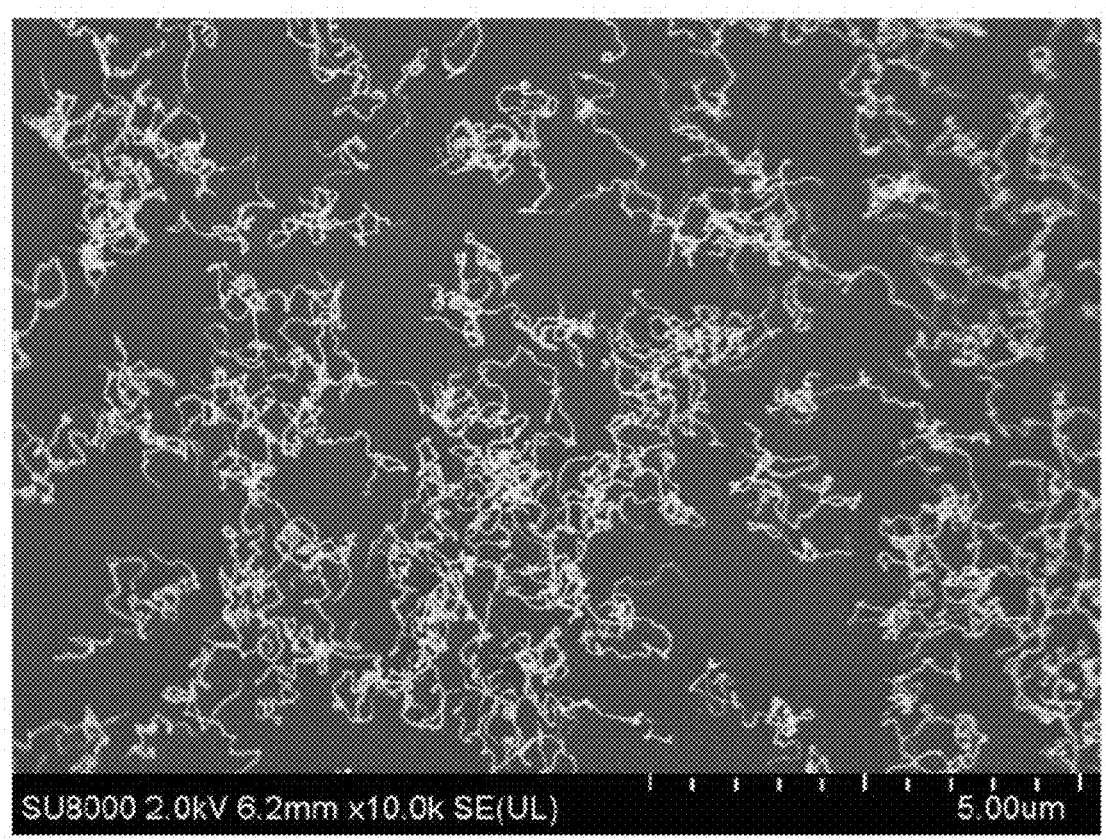
FIG. 17 is a scanning electron microscopy (SEM) diagram of the carbon nanotubes prepared by Example 8 of the present invention.
Figure 18:
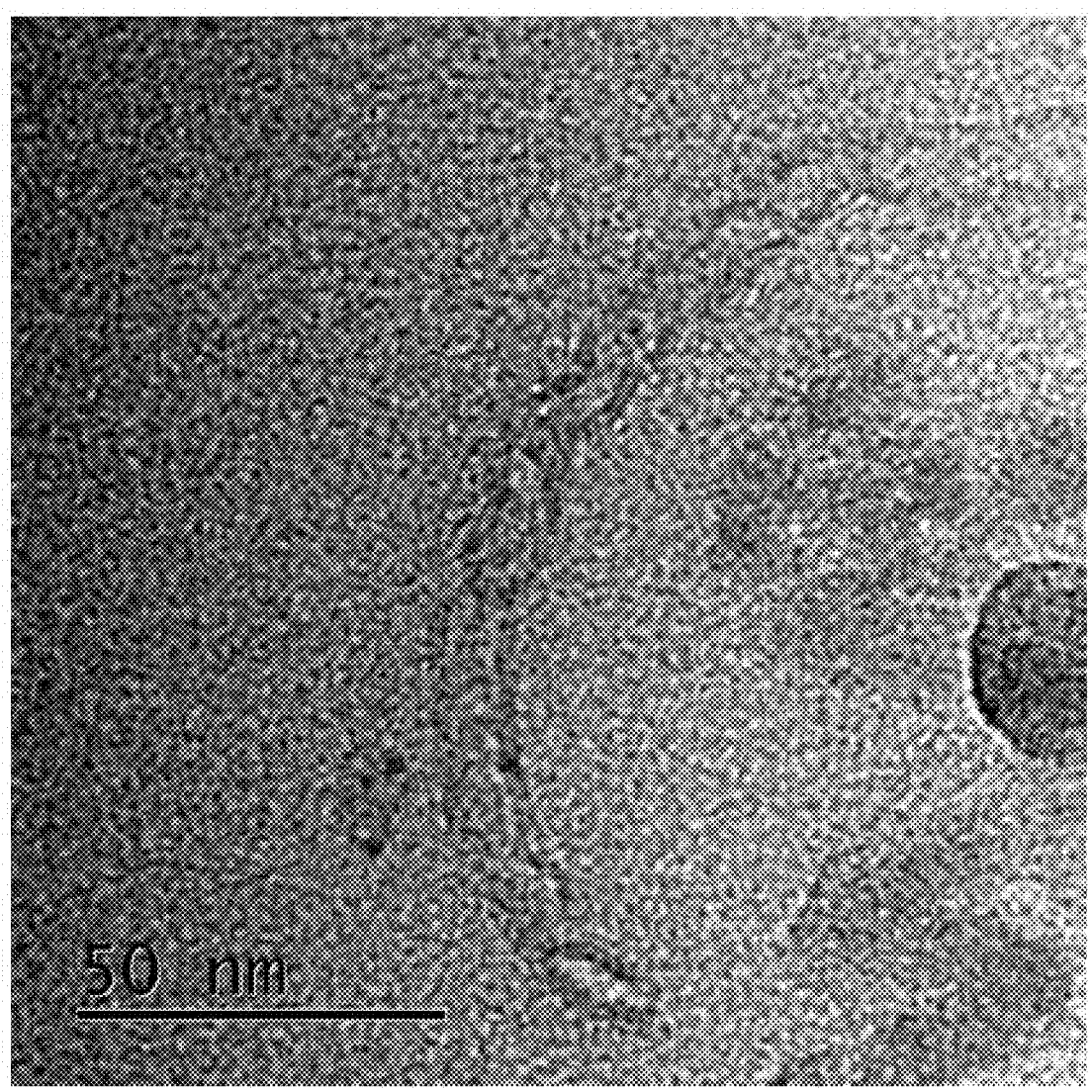
FIG. 18 is a transmission electron microscopy (TEM) diagram of the carbon nanotubes prepared by Example 8 of the present invention.

Observed by FSEM and HRTEM, as shown in FIG. 17 whose magnification times was 10K and FIG. 18, the products were the nanotubes. On the other hand, the resistance was detected by the multimeter, and the resistance was 67Ω-267Ω, proving that the resistance value was low, and the conductivity was good.

Example 9

The difference from Example 7 was that: polyethylene glycol 2000 was used instead of dipropylene glycol.

Figure 19:
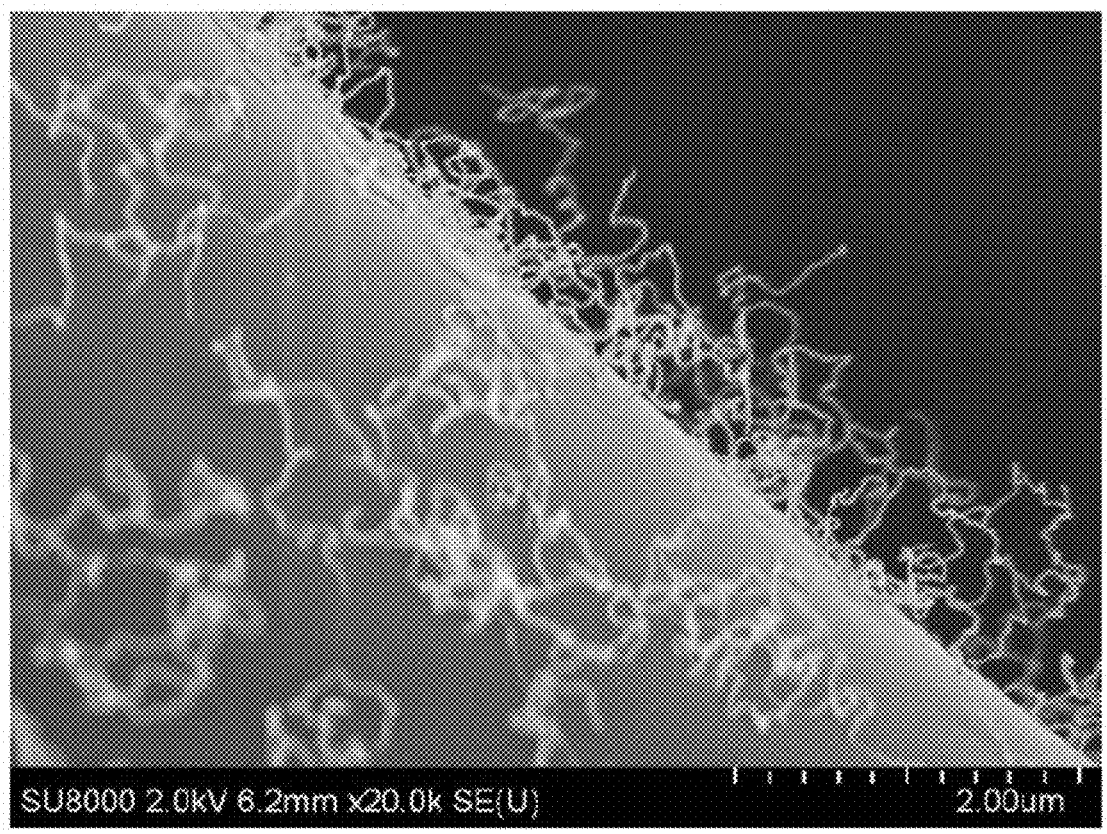
FIG. 19 is a scanning electron microscopy (SEM) diagram of the carbon nanotubes prepared by Example 9 of the present invention.
Figure 20:
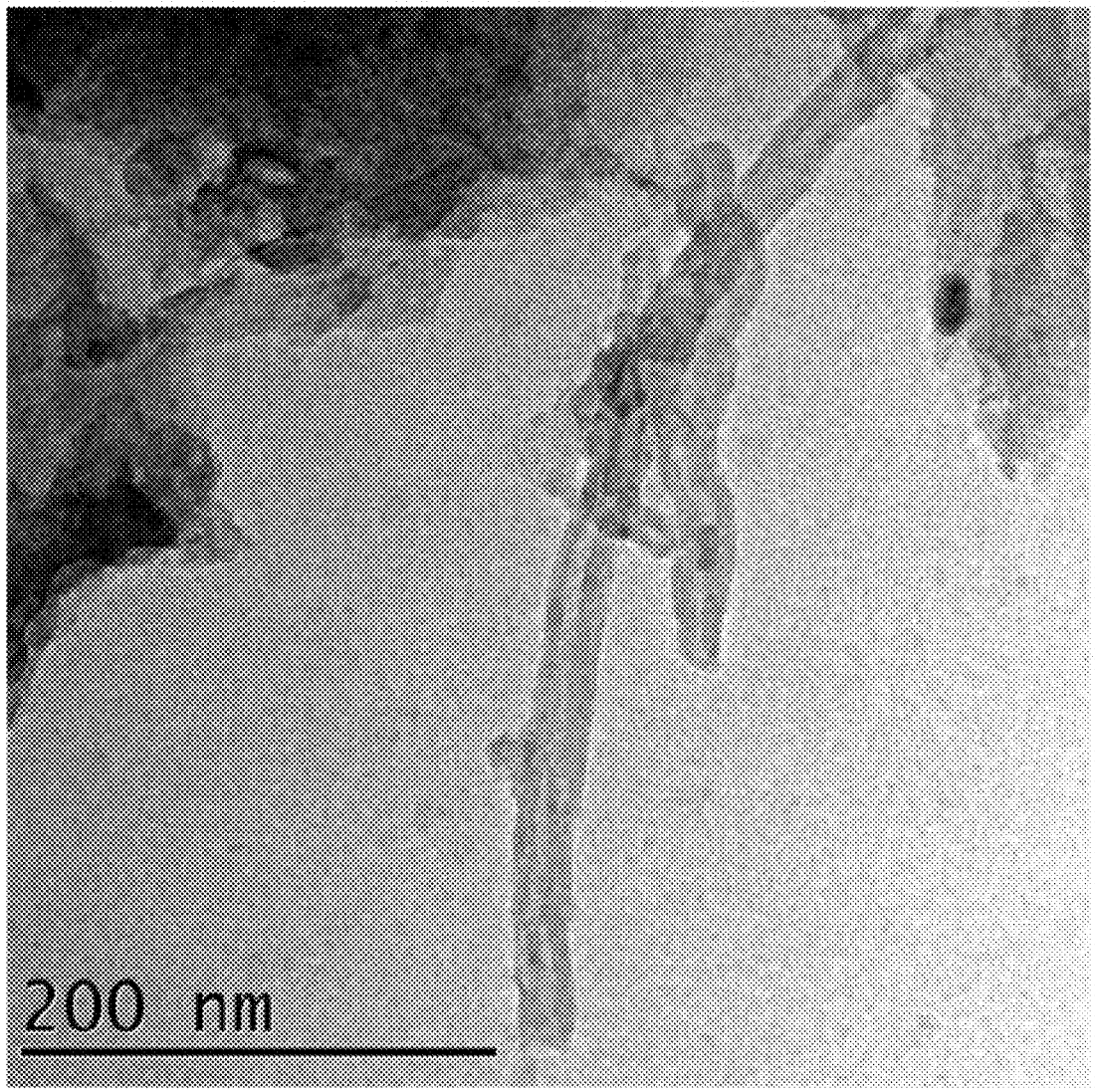
FIG. 20 is a transmission electron microscopy (TEM) diagram of the carbon nanotubes prepared by Example 9 of the present invention.

Observed by FSEM and HRTEM, as shown in FIG. 19 whose magnification times was 20K and FIG. 20, the products were the nanotubes. On the other hand, the resistance was detected by the multimeter, and the resistance was 54Ω-178Ω, proving that the resistance value was low, and the conductivity was good.

Example 10

The difference from Example 1 was that, MWCNTs were prepared by adding raw materials of Table 9.

TABLE 9

| Raw materials (g) | | | |
| --- | --- | --- | --- |
| Waste PET | NPG | DPG | Tetrabutyl titanate |
| 45 | 3 | 2 | 3 |

Waste PET sheets were difficult to degrade to a state of white brittleness and retained its original state of transparency.

Example 11

The difference from Example 1 was that, MWCNTs were prepared by adding raw materials of Table 10.

TABLE 10

| Raw materials (g) | | | |
| --- | --- | --- | --- |
| Waste PET | NPG | DPG | Tetrabutyl titanate |
| 8 | 25 | 20 | 7 |

Waste PET was rapidly degraded to liquid alcoholysis products, which could not be used for the subsequent preparation of the carbon nanotubes.

From the above examples, it can be seen that, by the method of the present invention, examples 1-9 used waste PET bottles to carry out alcoholysis in the presence of alcohols, and the intermediates that the alcoholysis is not completely carried out were calcined to obtain integrated block array carbon nanotubes which had hydrophobic effect, low aspect ratio, low resistance and good conductivity. While in example 10 and example 11, it was difficult to obtain intermediates that could be used for subsequent preparation of the carbon nanotubes because the proportion of raw material was beyond the scope of the present invention, and therefore, it was difficult to prepare the carbon nanotubes.

The invention claimed is:

1. A method for preparing carbon nanotubes, comprising the steps of:
    step (1): carrying out alcoholysis of PET packaging materials with alcohol, to obtain alcoholysis products and intermediates comprising partial alcoholysis products of PET packaging materials wherein the alcoholysis is not completely carried out,
    step (2): separating the intermediates comprising the partial alcoholysis products of step (1) from the alcoholysis products,
    step (3): crushing the intermediates obtained from step (2) to obtain powder of the intermediates, and
    step (4): calcining the powder of step (3).

2. The method according to claim 1, wherein the alcoholysis of step (1) comprises steps of: mixing PET packaging materials with alcohol to form an alcoholysis reaction system, and adding a catalyst to the alcoholysis reaction system.

3. The method according to claim 2, wherein said catalyst is added to the alcoholysis reaction system of step (1) in 2 divided parts: adding a part of the catalyst for the first time, after completing reaction, the remaining part of the catalyst being added to the reaction system for the second time, and the reaction being continued.

4. The method according to claim 1, wherein in step (1), adding 10-40 parts by weight of the PET packaging materials, 8-45 parts by weight of alcohol, and 0.3-5 parts by weight of the catalyst for alcoholysis.

5. The method according to claim 1, wherein in step (1), the PET packaging materials by weight and alcohol by weight are put in a container and mixed at 150° C.-170° C., after 30-60 minutes, the temperature is adjusted to 200° C.-220° C., and a part of the catalyst is added to the reaction system, after completing reaction, the remaining catalyst is added to the reaction system and the reaction is continued; finally the reaction system continues to react at 20-35° C.

6. The method according to claim 1, wherein step (2) comprises the steps of: the separated intermediates being washed with anhydrous ethanol and deionized water alternately for several times, and then the intermediates being vacuum-dried.

7. The method according to claim 1, wherein step (3) further comprises: screening the crushed powder through a sieve to obtain the powder of the intermediates, said sieve having a screen size between 180 mesh to and 230 mesh of Taylor standard sieve.

8. The method according to claim 1, wherein, it is not necessary to use a catalyst in step (4).

9. The method according to claim 1, the PET packaging materials are waste PET packaging materials.

10. The method according to claim 2, wherein said catalyst is one or two or more selected from the group consisting of tetrabutyl titanate, isopropyl titanate, tetramethyl titanate, titanium tetrapropanolate, tetraethyl titanate, tetra amyl titanate, bis(triethanolamine)diisopropyltitanate, 2-hydroxypropanoic acid—titanium ammoniate hydrate, zinc acetate, dibutyltin oxide, manganese acetate, lead acetate, and cobalt acetate.

11. The method according to claim 1, wherein, said alcohol is one or two or more selected from the group consisting of monohydric alcohol or diol or their oligomers.

12. The method according to claim 11, wherein, said monohydric alcohol is one or two or more selected from the group consisting of methanol, ethanol, propanol, butanol, pentanol, hexanol, heptanol, octanol, nonanol, decyl alcohol and hendecanol.

13. The method according to claim 11, wherein, said diol is one or two or more selected from the group consisting of neopentyl glycol, dipropylene glycol, ethylene glycol, 1,4-cyclohexanedimethanol, cyclobutanediol, 1, 2-propylene glycol, 1,3-propylene glycol, 2-methyl-propanediol, 1,4-butanediol, 1,5-pentadiol, 1,6-hexanediol, diethylene glycol, triethylene glycol, propylene glycol, tripropylene glycol, poly (tetrahydrofuran), polyethylene glycol and polypropylene glycol.

14. The method according to claim 1, wherein, in step (1), adding 10-40 parts by weight of waste PET packaging materials, 5-25 parts by weight of neopentyl glycol, 3-20 parts by weight of dipropylene glycol, and 0.3-5 parts by weight of tetrabutyl titanate for alcoholysis.

15. The method according to claim 12, wherein, the waste PET packaging materials are purified in step (A) before the alcoholysis of step (1), said purification step (A) comprises the following steps:

step one, the waste PET packaging materials are cut into sheets to obtain waste PET sheets;

step two, the waste PET sheets obtained from step one are cleaned in water and filtered;

step three, the waste PET sheets obtained from step two are repeatedly cleaned for several times; and step four, the waste PET sheets obtained from step three are dried naturally, and then are vacuum-dried.

\* \* \* \* \*